United States Patent [19]

Higraff et al.

[11] Patent Number: 4,744,065
[45] Date of Patent: May 10, 1988

[54] REINFORCING DEVICE IN THE INNER PORTION OF SEISMIC CABLES

[75] Inventors: Thor Higraff; Julius Bendiksen, both of Tertnes; Jan-Åge Langeland, Garnes, all of Norway

[73] Assignee: Geco A.S., Kjorbokollen, Sandvika, Norway

[21] Appl. No.: 9,812

[22] Filed: Feb. 2, 1987

[30] Foreign Application Priority Data

Feb. 14, 1986 [NO] Norway ................................. 860564

[51] Int. Cl.⁴ ...................... H04B 11/00; H01B 7/12; B63B 21/04
[52] U.S. Cl. .................................. 367/191; 174/101.5; 174/89; 114/253; 29/461
[58] Field of Search ........................... 114/253, 254; 174/101.5, 102 R, 70 S, 73 R, 74 R, 84 C, 84 S, 89, 103, 104, 108, 109; 339/136 R, 137, 139 R, 139 C, 142; 29/461, 594, 602 A; 340/850; 367/15, 16, 17, 18, 19, 20, 106, 130, 141, 153, 154, 169, 191; 181/110, 111, 112

[56] References Cited

U.S. PATENT DOCUMENTS

| | | | |
|---|---|---|---|
| 1,073,596 | 9/1913 | Egerton | 174/89 |
| 3,600,499 | 8/1971 | Hibbs | 174/70 S |
| 3,855,414 | 12/1974 | Alleva et al. | 174/89 |
| 3,982,062 | 9/1976 | Simmons | 380/12 |
| 3,997,230 | 12/1976 | Secretan | 367/154 |
| 4,180,103 | 12/1979 | Mollere | 367/106 X |
| 4,185,264 | 1/1980 | Chrastina | 174/101.5 X |
| 4,259,543 | 3/1981 | Oldham | 174/70 S |
| 4,313,028 | 1/1982 | Oldham et al. | 174/70 S |
| 4,525,813 | 6/1985 | Barrage | 174/101.5 X |
| 4,594,696 | 6/1986 | Lien et al. | 114/253 X |

FOREIGN PATENT DOCUMENTS 845590  8/1960  United Kingdom ............. 174/70 S

Primary Examiner—Deborah L. Kyle
Assistant Examiner—Brian Steinberger
Attorney, Agent, or Firm—Holman & Stern

[57] ABSTRACT

A reinforcing device to achieve stable fastening points for the inner portion (2) of seismic cables, especially cables that are towed laterally displaced in parallel in relation to the towing vessel and provided with at least two layers of armoring (5,6) intended for absorbing stretch loads on said cable, comprises a fastening means on at least one of the end areas of the inner portion (2), and gripping surfaces for external equipment and shaped with at least two securing chambers (3,4). For assembling the outermost layers of armoring (5,6) of said cable are separated and inserted into one chamber each (3, 4), wherein they are secured to form an integrated connection with said casing (2).

17 Claims, 2 Drawing Sheets

REINFORCING DEVICE IN THE INNER PORTION OF SEISMIC CABLES

BACKGROUND OF THE INVENTION

1. Field of the Invention

The invention relates to a reinforcing device in the inner portion (lead in) of seismic cables, especially cables that are towed laterally and displaced in parallel in relation to the towing vessel, wherein said cable is provided with at least two layers of reinforcement intended to absorb stretch loads.

2. Description of the Prior Art

When seismic cables are towed behind a vessel at sea the cable will be subjected to great stretch loads due to the movement through the water. This is especially true when the seismic cables are towed displaced in parallel in relation to the towing vessel, i.e. when, e.g. a number of parallel hydrophone cables or streamers are towed side-by-side. In such cases the inner portion of the cable, which is often designated the "lead in" stretch portion, will extend obliquely in relation to the towing direction to a fastening point for an otter board/paravane member, from which point the cable follows the towing direction. Said oblique inner portion of the cable is, thus, subjected to great forces both because it extends across the towing direction and is, thus, subjected to lateral forces, and because it is subjected to stretch forces from the buoyancy member and the otter board in addition to the extension of the cable itself.

A cable design with several outside layers of reinforcement, commonly two, is therefore used, especially in the inner portion of such cables. To achieve satisfactory transmission of forces at both ends of said inner portion, hitherto direct clamping of the cable, e.g. in a clamp block, provided in the angular fastener, was used, the cable being bent in the towing direction, and with additional clamping with a similar fastener in the fastening area at the towing vessel itself. These fastening methods were not satisfactory, and there were increasing problems with increasing efforts to use a larger number of cables or streamers, respectively, side-by-side in parallel, causing increasing lengths of the inner portion of the cable. Thus, friction and slip in the fasteners will easily result, rendering the towing conditions somewhat uncertain, and additionally, considerable damage to the main cable portion may result.

BRIEF SUMMARY OF THE INVENTION

It is an object of the present invention to provide a device which overcomes the above problems in connecting or fastening the inner portion of seismic cables. It is, thus, another object of the invention to provide a reinforcing device for such fastening areas for the inner cable portion, whereby the cable is gripped in a reliable and stable manner without hazard of torsion and displacements that may cause damage in the fastening area.

These objects are achieved by the reinforcing device of the invention wherein is provided the cable with a device that ensures effective contact with the external equipment in the areas intended for securing the cable thereto at the same time the device is reliably secured to the carrying portion of the cable, i.e. the reinforcement. Such a device may either be mounted firmly in advance, or it may be mounted in a comparatively simple manner, when it is required.

The invention will now be described in greater detail below with reference to two embodiments shown accompanying drawings, wherein.

DETAILED DESCRIPTION

Figures 1, 1A:
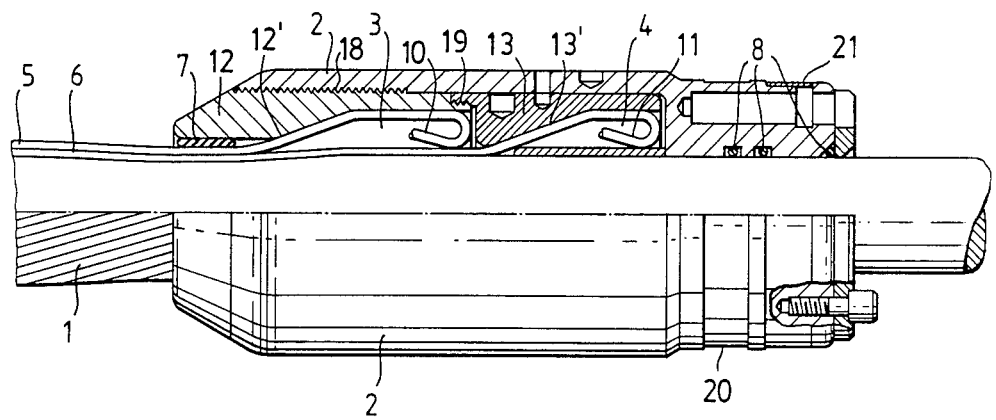
FIG. 1 is a side elevational partly cross-sectional view of the device according to the invention in a first embodiment intended for mounting at the outer end of an inner cable portion.
FIG. 1a is an enlarged cross-sectional view of the gripping surface grooves.
Figures 2, 2A:
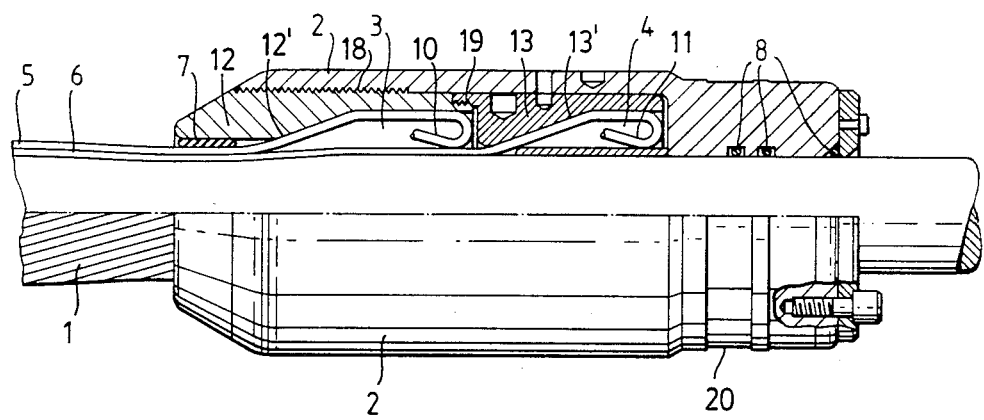
FIG. 2 is a similar to FIG. 1 of a device intended for mounting on the cable in the area near the haul-in and pay-out winch.
FIG. 2a is an enlarged cross-sectional view similar to FIG. 1.

The inner portion of a seismic cable, e.g. a streamer, is designated 1 in the drawing. In the area where it is desirable to fasten the cable a reinforcement device according to the invention is provided. The device comprises a casing 2 wherein chambers 3 and 4 are provided. Cable 1 has exterior layers 5 and 6 of armoring. At the point where the reinforcement device is to be provided, the layers of armoring are exposed and are inserted into a chamber each, 3 and 4, respectively, and the end portions in the embodiment shown in FIGS. 1 and 2 are each bent into an ear 10, 11.

The outer areas of the chambers may each have a conical shape 12', 13' formed on the interior surface of substantially cylindrical inserts 12, 13 in casing 2 and connected by screw thread connections 18 and 19 so that the cable armoring is firmly clamped when the casing is tightened. Additional fastening may be achieved if each chamber is. e.g. filled with a curable casting material, e.g. a polymer, or epoxy, material (not shown in this embodiment). In order to ensure the best possible protection for the cable the casing is provided with seals, e.g. a shrunk ring 7 at one end and O-ring seals 8 at the other end. As will appear from the drawings, approximately identical designs for the reinforcement devices are used at both ends of the cable, only the manner of assembling the casing, and any possible screw connections being changed. These features of assembling the casing are not disclosed in greater detail, since they will be obvious to those skilled in the art.

Figure 3:
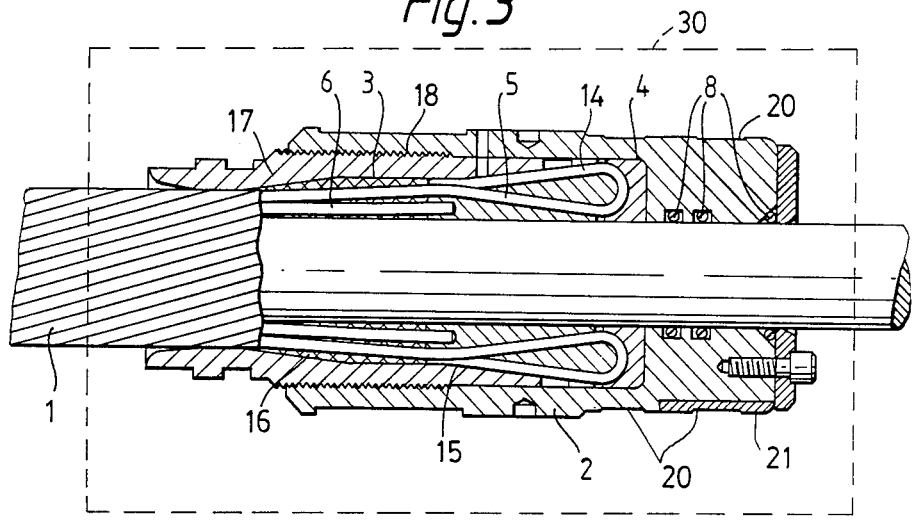
FIGS. 3 and 4 are cross-sectional views corresponding to FIGS. 1 and 2, respectively of another embodiment of the invention.
Figure 4:
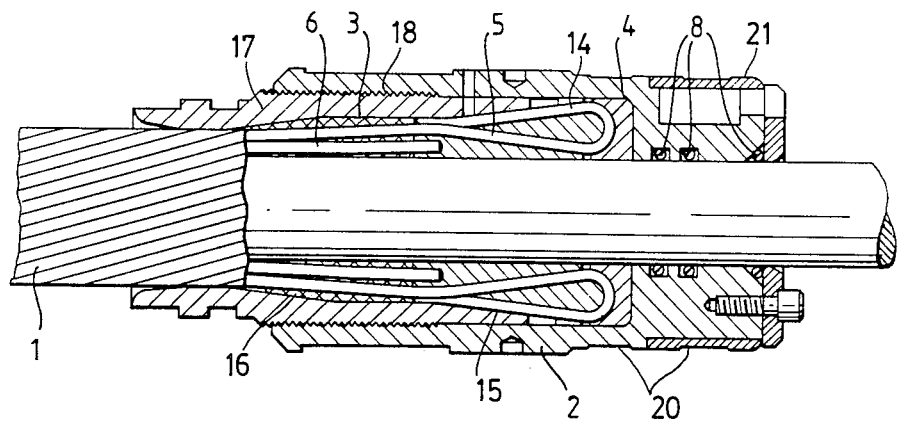

In FIGS. 3 and 4 a simplified embodiment of the device according to the invention is shown, wherein the armoring is again exposed inside the casing, but the arrangement of chambers is somewhat different from the above first disclosed embodiment. In this case the ends of the wires of one layer 5 of armoring are bent back to form ears 14 and subjected to the clamping effect of a conical surface 15 of insert 17 to be held as firmly as possible. Armoring layer 6 inside layer 5 is cut shorter and is not shaped into an ear. In addition layer 6 is embedded by molding in curable casting material 16, e.g. a polymer, or epoxy, material as referred to above, and the molding also extends over part of the outer layer of armoring 5, as indicated at 16. In this manner a very strong and good connection may be achieved between the layers of armoring and the casing of the fastening device. In the same manner as in the above embodiment seals are provided at the end areas, i.e. O-rings are provided at one end, whereas the exterior protecting mantle of the cable forms a seal by clamping action at the other end of the casing by insert 17.

Gripping surfaces for external equipment, e.g. clamping blocks 30 in which the reinforcement devices are held in use, are provided by circular grooves 20 on the periphery of casing 2. These grooves may also be provided in sleeve members attached to casing 2, such as shown at 21, for example, various designs being shown in the drawings. The configuration of these grooves may be as shown in the enlarged cross-sectional views of FIGS. 1a and 2a and the external equipment may be in the form shown in phantom on FIG. 3, for example.

As appears from the shown embodiment several different fastening methods for the layers of armouring are possible inside the chambers in the interior of said casing. It is essential that a lasting connection is achieved securing the portions of the device casing to at least two layers of armouring in the cable in order to provide the desired possibility of fastening the inner portion of the seismic cable. Then the device may, e.g. be clamped in a clamping block of an angular member, as disclosed in NO Patent Application Ser. No.

We claim:

1. A reinforcing device for fastening an end of a seismic cable, wherein the cable has at least two outer layers of armoring for absorbing stretch loads on the cable, comprising:
    a casing member through which the cable extends;
    two securing chambers within said casing, the end of each armoring layer being separated and extending into a separate one of said securing chambers;
    the end portion of at least one of said armoring layers being bent back upon itself in a respective securing chamber;
    at least one substantially cylindrical hollow insert member within said releasably connectd to said casing member;
    an internal conical surface on said at least one insert member forming part of said securing chamber in which said bent-back end portion of at least one of said armoring layers is disposed, said conical surface engaging against said at least one armoring layer to thereby prevent relative withdrawal movement of said at least one armoring layer with respect to said casing; and
    seal means between said casing member and said cable for sealing the interior of said casing and said securing chambers from the ambient environment.

2. The reinforcing device as claimed in claim 1 wherein:
    the end portion of each armoring layer is bent back upon itself in a respective separate securing chamber;
    two said substantially cylindrical hollow insert members are provided each having a said internal conical surface forming a part of a respective securing chamber, each conical surface engaging against a respective armoring layer adjacent said bent-back end portion.

3. The reinforcing device as claimed in claim 2 and further comprising:
    an epoxy material molded in situ in said securing chamber.

4. The reinforcing device as claimed in claim 1 and further comprising:
    external gripping surfaces on the outer peripheral surface of said casing member for cooperatively engaging with external equipment.

5. The reinforcing device as claimed in claim 3 and further comprising:
    external gripping surfaces on the outer peripheral surface of said casing member for cooperatively engaging with external equipment.

6. A reinforcing device as claimed in claim 4 wherein:
    said gripping surfaces comprise circumferential grooves.

7. A reinforcing device as claimed in claim 5 wherein:
    said gripping surfaces comprise circumferential grooves.

8. A reinforcing device as claimed in claim 2 wherein:
    said conical surfaces have a larger diameter end adjacent said bent-back ends; and
    said bent-back ends are bent radially inwardly.

9. A reinforcing device as claimed in claim 2 wherein:
    said conical surfaces have a larger diameter end adjacent said bent-back ends; and
    said bent-back ends are bent radially inwardly.

10. A reinforcing device as claimed in claim 2 wherein:
    one of said inserts is threadedly connected to said casing member; and
    the other of said inserts is threadedly connected to said one insert.

11. A reinforcing device as claimed in claim 9 wherein:
    one of said inserts is threadedly connected to said casing member; and
    the other of said inserts is threadedly connected to said one insert.

12. A reinforcing device as claimed in claim 1 wherein said seal means comprises:
    O-ring seals adjacent one end of said casing member; and
    a cylindrical seal adjacent the other end of said casing.

13. A reinforcing device as claimed in claim 11 wherein said seal means comprises:
    O-ring seals adjacent one end of said casing member; and
    a cylindrical seal adjacent the other end of said casing.

14. A reinforcing device as claimed in claim 1 wherein:
    said outer layers of armoring comprise an inner and an outer layer;
    said bent-back end portion is on said outer layer;
    said layers have overlapping terminal end portions; and
    a portion of said outer layer adjacent the bent-back portion thereof and the end portion of said inner layer are embedded in epoxy material molded in situ in said securing chamber.

15. The reinforcing device as claimed in claim 14 and further comprising:
    external gripping surfaces on the outer peripheral surface of said casing member for cooperatively engaging with external equipment.

16. A reinforcing device as claimed in claim 14 wherein:
    said conical surface has a larger diameter end adjacent and in engagement with said bent-back portion.

17. A reinforcing device as claimed in claim 16 wherein:
    said conical surface has a larger diameter end adjacent and in engagement with said bent-back portion.

* * * * *